(12) United States Patent
Kang et al.

(10) Patent No.: US 12,074,480 B2
(45) Date of Patent: Aug. 27, 2024

(54) INTELLIGENT POWER GENERATION MODULE

(71) Applicants: LG Magna e-Powertrain Co., Ltd., Incheon (KR); AVL SOFTWARE AND FUNCTIONS GMBH, Regensburg (DE)

(72) Inventors: Hanbyul Kang, Seoul (KR); Sangchul Lee, Seoul (KR); Kyunghoon Lee, Seoul (KR); Robert Poschl, Judendorf-Strassengel (DE); Gernot Fuckar, Graz (DE); Markus Preuss, Regensburg (DE); Florian Bodensteiner, Regensburg (DE)

(73) Assignees: LG Magna e-Powertrain Co., Ltd., Incheon (KR); AVL SOFTWARE AND FUNCTIONS GMBH, Regensburg (DE)

( * ) Notice: Subject to any disclaimer, the term of this patent is extended or adjusted under 35 U.S.C. 154(b) by 377 days.

(21) Appl. No.: 17/479,605

(22) Filed: Sep. 20, 2021

(65) Prior Publication Data
US 2022/0006349 A1    Jan. 6, 2022

Related U.S. Application Data

(63) Continuation of application No. PCT/KR2019/003257, filed on Mar. 20, 2019.

(51) Int. Cl.
*H02K 11/30* (2016.01)
*H02K 5/20* (2006.01)
(Continued)

(52) U.S. Cl.
CPC ............ *H02K 11/30* (2016.01); *H02K 5/203* (2021.01); *H02K 7/116* (2013.01); *H02K 9/19* (2013.01)

(58) Field of Classification Search
CPC ........ H02K 11/30; H02K 5/203; H02K 7/116; H02K 9/19; H02K 1/278; H02K 5/225;
(Continued)

(56) References Cited

U.S. PATENT DOCUMENTS 7,775,060 B2    8/2010    Nakajima et al.
8,629,586 B2    1/2014    Minemura et al.
(Continued)

FOREIGN PATENT DOCUMENTS

CN    102782998    11/2012
CN    104638838    5/2015
(Continued)

OTHER PUBLICATIONS

Extended European Search Report in European Appln. No. 19920143.5, dated Sep. 30, 2022, 7 pages.
(Continued)

*Primary Examiner* — Ahmed Elnakib
(74) *Attorney, Agent, or Firm* — Fish & Richardson P.C.

(57) ABSTRACT

An intelligent power generation module includes: an electric motor including a motor housing, an inverter disposed at a first side of the motor housing and including an inverter housing configured to accommodate an insulated gate bipolar transistor (IGBT), an inner housing disposed inside the motor housing, and a dual flow path disposed at a circumferential surface of the motor housing on which the inner housing is disposed. The dual flow path includes a plurality of first cooling flow paths spaced apart from each other and through which a first fluid flows, a second cooling flow path defined between the plurality of first cooling flow paths and through which a second fluid flows, and a plurality of injection nozzles disposed at each of the plurality of first
(Continued)

cooling flow paths, spaced apart from each other, and configured to spray the first fluid to an inner space of the inner housing.

15 Claims, 15 Drawing Sheets

(51) Int. Cl.
*H02K 7/116* (2006.01)
*H02K 9/19* (2006.01)

(58) Field of Classification Search
CPC ...... H02K 2211/03; H02K 11/33; H02K 5/20; H02K 9/193; H02K 9/197
USPC .................................................. 310/408, 54
See application file for complete search history.

(56) References Cited

U.S. PATENT DOCUMENTS

| | | | |
|---|---|---|---|
| 2004/0163409 A1* | 8/2004 | Nakajima | B60L 3/003 62/505 |
| 2010/0077786 A1 | 4/2010 | Siegenthaler et al. | |
| 2010/0102647 A1 | 4/2010 | Savant | |
| 2013/0049495 A1* | 2/2013 | Matsuo | G06F 16/1748 310/59 |
| 2013/0278090 A1* | 10/2013 | Matsuo | H02K 9/193 310/54 |
| 2014/0217842 A1 | 8/2014 | Kikuchi et al. | |
| 2016/0134177 A1 | 5/2016 | Itoh et al. | |
| 2019/0006908 A1* | 1/2019 | Scharlach | H02K 5/203 |

FOREIGN PATENT DOCUMENTS

| | | |
|---|---|---|
| CN | 105207398 | 12/2015 |
| CN | 105375694 | 3/2016 |
| CN | 105515281 | 4/2016 |
| CN | 106655647 | 5/2017 |
| CN | 108574365 | 9/2018 |
| CN | 108667215 | 10/2018 |
| CN | 109217541 | 1/2019 |
| CN | 109361286 | 2/2019 |
| JP | 2010-263715 | 11/2010 |
| JP | 2011-135699 | 7/2011 |
| JP | 2012-105487 | 5/2012 |
| JP | 2013-162674 | 8/2013 |
| JP | 2018-057112 | 4/2018 |
| KR | 10-2011-0136055 | 12/2011 |

OTHER PUBLICATIONS

Office Action in Chinese Appln. No. 201980094401.9, mailed on Jun. 12, 2023, 34 pages (with English translation).
Office Action in Chinese Appln. No. 201980094399.5, mailed on Nov. 9, 2023, 36 pages (with English translation).
Notice of Allowance in Chinese Appln. No. 201980094399.5, mailed on Mar. 5, 2024, 8 pages (with English translation).

* cited by examiner

INTELLIGENT POWER GENERATION MODULE

CROSS-REFERENCE TO RELATED APPLICATIONS

This application is a continuation of International Application No. PCT/KR2019/003257, filed on Mar. 20, 2019, the contents of which are all hereby incorporated by reference herein in their entirety.

TECHNICAL FIELD

The present disclosure relates to an intelligent power generation module having a motor cooling structure of an oil-water combined cooling system.

BACKGROUND

Recently, an electric vehicle or a hybrid vehicle having an electric motor as a driving source for driving the vehicle and an excellent fuel efficiency has been introduced.

In general, an Intelligent Power Generation Module (IPGM) is a device including an electric motor, an inverter, and a gearbox.

An electric motor (or motor) includes a rotor and a stator, and the rotor may be rotatably provided inside the stator.

The stator includes a stator coil wound around a stator core. When current flows through the stator coil to rotate the rotor, heat is generated in the stator coil. Technologies for cooling the heat generated in the electric motor have been developed.

As for an electric motor used in an electric vehicle, cooling of heat generated in the electric motor plays an important role in achieving a smaller and more efficient electric motor.

A conventional motor cooling method includes an indirect cooling method for indirectly cooling down a motor by circulating cooling water in a housing, and a direct cooling method for directly cooling down a motor by spraying oil onto a stator or a rotor.

A conventional IPGM cooling structures include a type 1 using oil to cool a motor and water to cool an inverter, and a type 2 using cooling water to cool both the motor and inverter.

However, both the types 1 and 2 selectively use one of cooling fluids, namely, the oil and the cooling water for cooling the motor, but there is no motor cooling structure employing both of the two types.

On the other hand, the direct cooling method using the oil has high cooling efficiency and cooling performance, compared to the indirect cooling method using the cooling water. Thus, research and development on the direct cooling method have been actively carried out recently.

For example, a conventional rotary electric machine includes a cooling mechanism in which two outlets are formed in a cooling water supply pipe located at an upper portion of a stator such that oil can be supplied to right and left sides of an end coil.

However, in the structure of dropping oil from the upper portion of the stator, the design of the manifold is required for oil cooling for all sections of the stator coil in a circumferential direction.

Also, a section in which an end turn of the stator coil is not wetted by the oil may be generated depending on a spray position or angle of the oil outlets.

SUMMARY

The present disclosure is directed to an intelligent power generation module having a dual flow path structure capable of cooling an electric motor by both oil and cooling water through a cooling water flow channel and an oil flow channel provided in an inner housing.

Another aspect of the present disclosure is directed to an intelligent power generation module capable of spraying oil to a stator coil in all sections of 360 degrees in a circumferential direction of a stator.

According to one aspect of the subject matter described in this application, an intelligent power generation module can include an electric motor that includes a motor housing defining an appearance of the electric motor, an inverter that is disposed at a first side of the motor housing and that includes an inverter housing configured to accommodate an insulated gate bipolar transistor (IGBT) and a capacitor, an inner housing that is disposed inside the motor housing and that is configured to accommodate a stator and a rotor, and a dual flow path disposed at a circumferential surface of the motor housing on which the inner housing is disposed. The dual flow path can include a plurality of first cooling flow paths spaced apart from each other in a longitudinal direction of the inner housing and through which a first fluid flows, a second cooling flow path defined between the plurality of first cooling flow paths and through which a second fluid flows, and a plurality of injection nozzles that are disposed at each of the plurality of first cooling flow paths, that are spaced apart from each other, and that are configured to spray the first fluid to an inner space of the inner housing.

Implementations according to this aspect can include one or more of the following features. For example, the first fluid can be oil and the second fluid can be water.

In some implementations, the plurality of injection nozzles can extend in a radial direction of the inner housing, can be spaced apart from each other in a circumferential direction of the inner housing, and can be configured to spray the first fluid onto a stator coil of the stator. In some implementations, the plurality of first cooling flow paths can include a plurality of oil channels extending in a circumferential direction of the inner housing.

In some examples, the second cooling flow path can comprise a plurality of water channels disposed between the plurality of oil channels that are spaced apart from each other in the longitudinal direction of the inner housing and that extend along the circumferential direction of the inner housing. In some examples, the second cooling flow path can include a plurality of first water channels disposed at a front portion of the inner housing in the longitudinal direction and extending along the circumferential direction of the inner housing, a plurality of second water channels disposed at a rear portion of the inner housing in the longitudinal direction and extending along the circumferential direction of the inner housing, and a water channel connecting part extending from a first side of the plurality of first water channels toward the plurality of second water channels in the longitudinal and circumferential directions of the inner housing and provide fluid communication between the plurality of first water channels and the plurality of second water channels.

In some implementations, the inner housing can further include a plurality of O-rings each disposed at both sides of each oil channel to provide sealing between the plurality of oil channels and the plurality of water channels. In some implementations, the inner housing can include a plurality of flow path forming protrusions that extend in the circumferential direction of the inner housing and that define the plurality of oil channels or the plurality of water channels.

In some examples, the inner housing can include a plurality of first flow path forming protrusions that extend in the circumferential direction of the inner housing and that define the plurality of first water channels, a plurality of second flow path forming protrusions that extend in the circumferential direction of the inner housing and that define the plurality of second water channels, an intermediate partition wall that extends in the circumferential direction of the inner housing, that protrudes a radial direction of the inner housing, that contacts the motor housing, and that partitions the plurality of first water channels and the plurality of second water channels from each other, a flow path forming protrusion connecting portion that extends in the circumferential and longitudinal directions of the inner housing and that connects the plurality of first water channels to the plurality of second water channels, and an intermediate partition wall connecting portion that extends from a flow path forming protrusion providing a boundary between one of the plurality of oil channels and the first water channels toward one side of the intermediate partition wall in the circumferential and longitudinal directions or that extend from another side of the intermediate partition wall toward a flow path forming protrusion providing a boundary between another one of the plurality of oil channels and the second water channels in the circumferential and longitudinal directions.

In some examples, the plurality of O-rings can be disposed in a spaced manner in the longitudinal direction of the inner housing, mounted on a concentric circle of the inner housing, and have diameters that are reduced toward an inside of the motor housing. In some implementations, the inner housing can include an inflow-side common header that is defined at an inlet side of the plurality of water channels and that is configured to distribute water to the plurality of water channels, and an outflow-side common header defined at an outlet side of the plurality of water channels and that is configured to collect the water from the plurality of water channels.

In some implementations, the inner housing can include an inflow-side common header that is defined at an inlet side of the plurality of first water channels and that is configured to distribute water to the plurality of first water channels, and an outflow-side common header that is defined at an outlet side of the plurality of second water channels and that is configured to collect the water from the plurality of second water channels. In some implementations, the module can further include an oil sump that is disposed at an inner lower portion of the motor housing and that is configured to receive the oil, and an oil pump that is mounted on a second side of the motor housing and that is configured to circulate the oil in the oil sump to the plurality of injection nozzles.

In some examples, the module can further include a heat exchanger that is mounted on a third side of the motor housing and that is configured to perform heat-exchange between (i) oil received from the oil pump to be transferred to the plurality of injection nozzles and (ii) water, to cool down the oil.

According to another aspect of the subject matter described in this application, an intelligent power generation module can include an electric motor that includes a motor housing defining an appearance of the electric motor, an inverter that is disposed at a first side of the motor housing and that includes an inverter housing configured to accommodate an insulated gate bipolar transistor (IGBT) and a capacitor, a gearbox that is disposed at a second side of the motor housing and that includes a plurality of gears configured to reduce a rotational speed of the electric motor, an inner housing that is disposed inside the motor housing and that is configured to accommodate a stator and a rotor, and a dual flow path disposed at a circumferential surface of the motor housing on which the inner housing is disposed.

Implementations according to this aspect can include one or more of the following features. For example, the dual flow path can include a plurality of first cooling flow paths spaced apart from each other in a longitudinal direction of the inner housing and through which a first fluid flows, a second cooling flow path defined between the plurality of first cooling flow paths and through which a second fluid flows, and a plurality of injection nozzles that are disposed at each of the plurality of first cooling flow paths, that are spaced apart from each other, and that are configured to spray the first fluid to an inner space of the inner housing.

In some examples, the first fluid can be oil and the second fluid can be water. In some examples, the plurality of injection nozzles can extend in a radial direction of the inner housing, can be spaced apart from each other in a circumferential direction of the inner housing, and can be configured to spray the first fluid onto a stator coil of the stator.

In some implementations, the plurality of first cooling flow paths can include a plurality of oil channels extending in a circumferential direction of the inner housing. In some examples, the second cooling flow path can include a plurality of water channels disposed between the plurality of oil channels that are spaced apart from each other in the longitudinal direction of the inner housing and that extend along the circumferential direction of the inner housing.

Hereinafter, effects of an intelligent power generation module will be described.

First, an inner housing may additionally be mounted inside a motor housing and a plurality of oil channels and a plurality of water channels may be formed in an inner housing. Also, the plurality of oil channels may be sealed with a plurality of O-rings, respectively, and then an oil-water combined cooling structure for simultaneous cooling with oil and cooling water, which may result in improving motor cooling efficiency, compared to a cooling structure only using cooling water or oil in the conventional module.

Second, a plurality of injection nozzles may be arranged to be spaced apart in an entire section of 360 degrees of the inner housing along a circumferential direction of the inner housing, and spray oil to the 360-degree entire section in the circumferential direction to directly cool a stator coil. Accordingly, cooling performance of the oil can be uniformly maintained in the circumferential direction of the stator coil even when an electronic vehicle turns, travels uphill or downhill, or is accelerated/decelerated, and an occurrence of a dead zone of oil cooling in which the stator coil is not wetted by the oil can be limited.

Third, the motor housing and the inner housing can be manufactured by die casting, and the motor housing for water cooling may not have to be formed by gravity casting, thereby improving productivity.

Fourth, the electric motor can employ a structure for cooling only using cooling water without an oil cooling structure, if necessary. For example, a low-cost product can be configured to have a cooling structure only using cooling water without an oil pump and a heat exchanger.

Fifth, a high output electric motor can employ a cooling structure simultaneously using both oil and cooling water so as to continuously maintain a high output.

DETAILED DESCRIPTION

Figure 1:
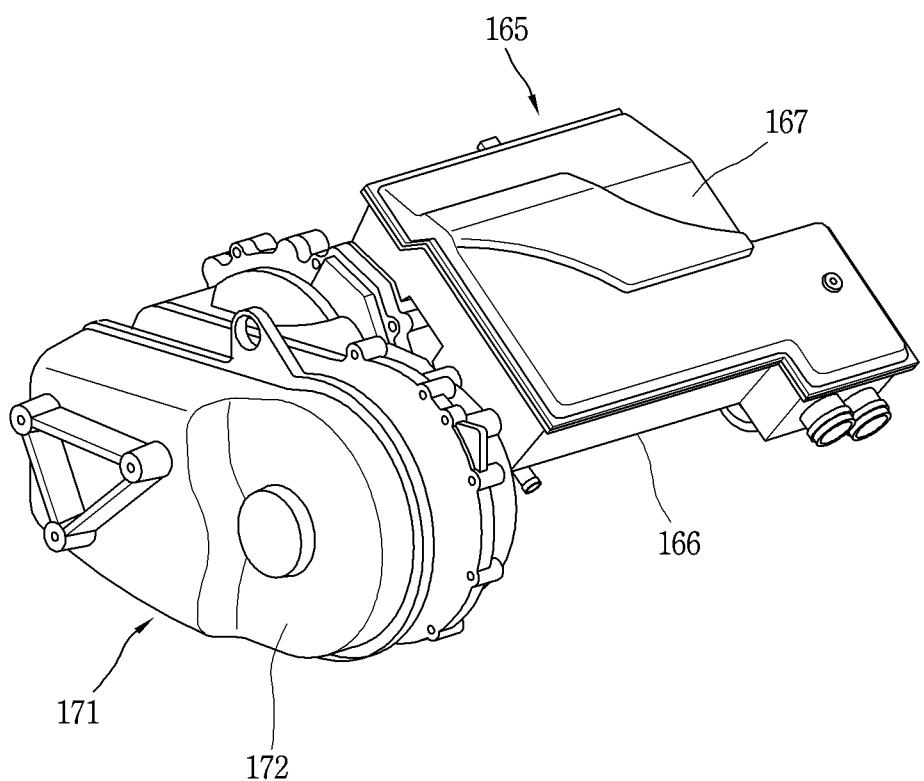
FIG. 1 is a diagram illustrating an exemplary intelligent power generation module (IPGM).
Figure 2:
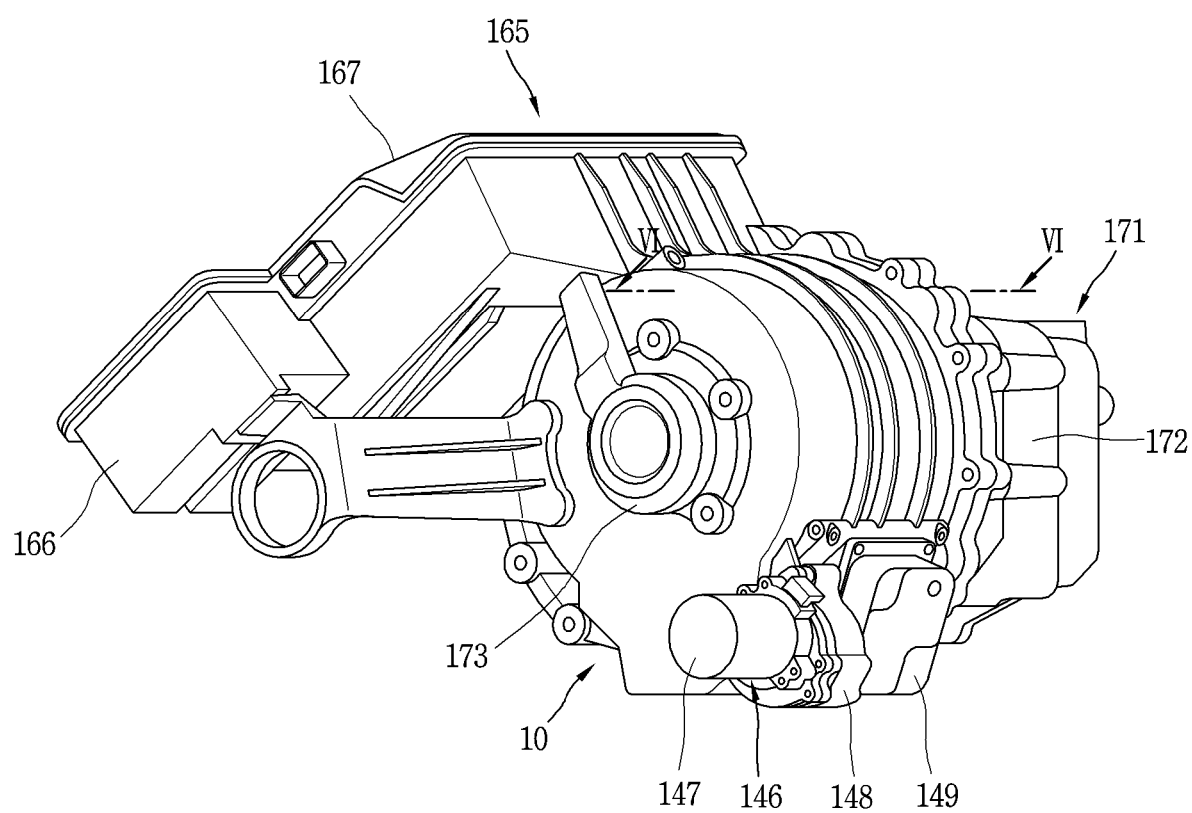
FIG. 2 is a diagram illustrating the exemplary IPGM of FIG. 1, viewed from another angle.
Figure 3:
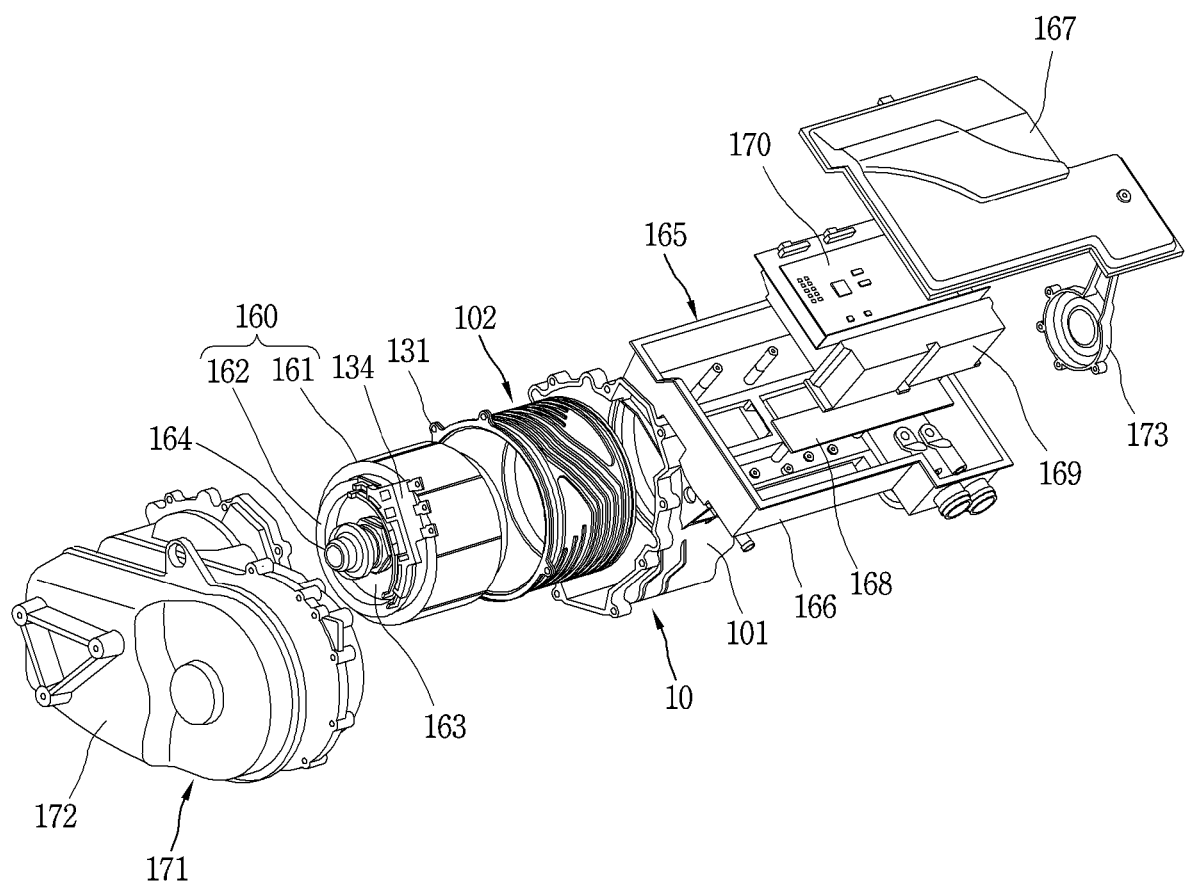
FIG. 3 is a diagram illustrating an exploded view of the exemplary IPGM in FIG. 1.
Figure 4:
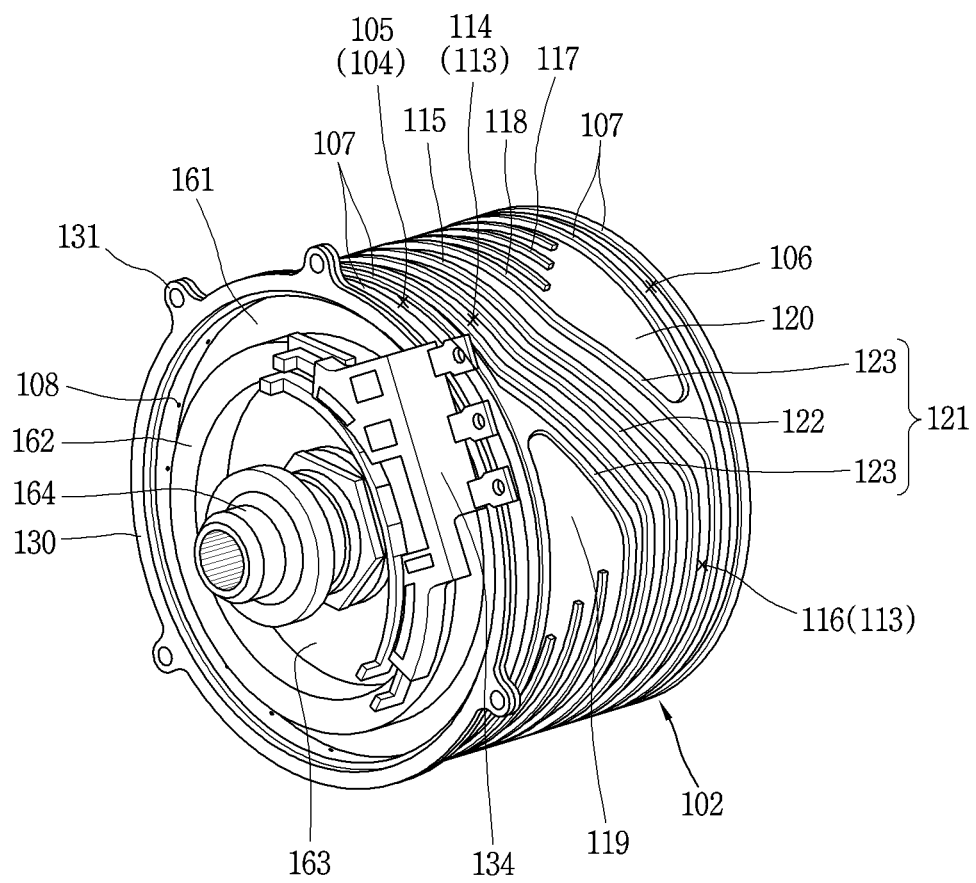
FIG. 4 is a diagram illustrating a perspective view of a state in which a stator and a rotor are mounted inside an inner housing of the exemplary IPGM in FIG. 3.
Figure 5:
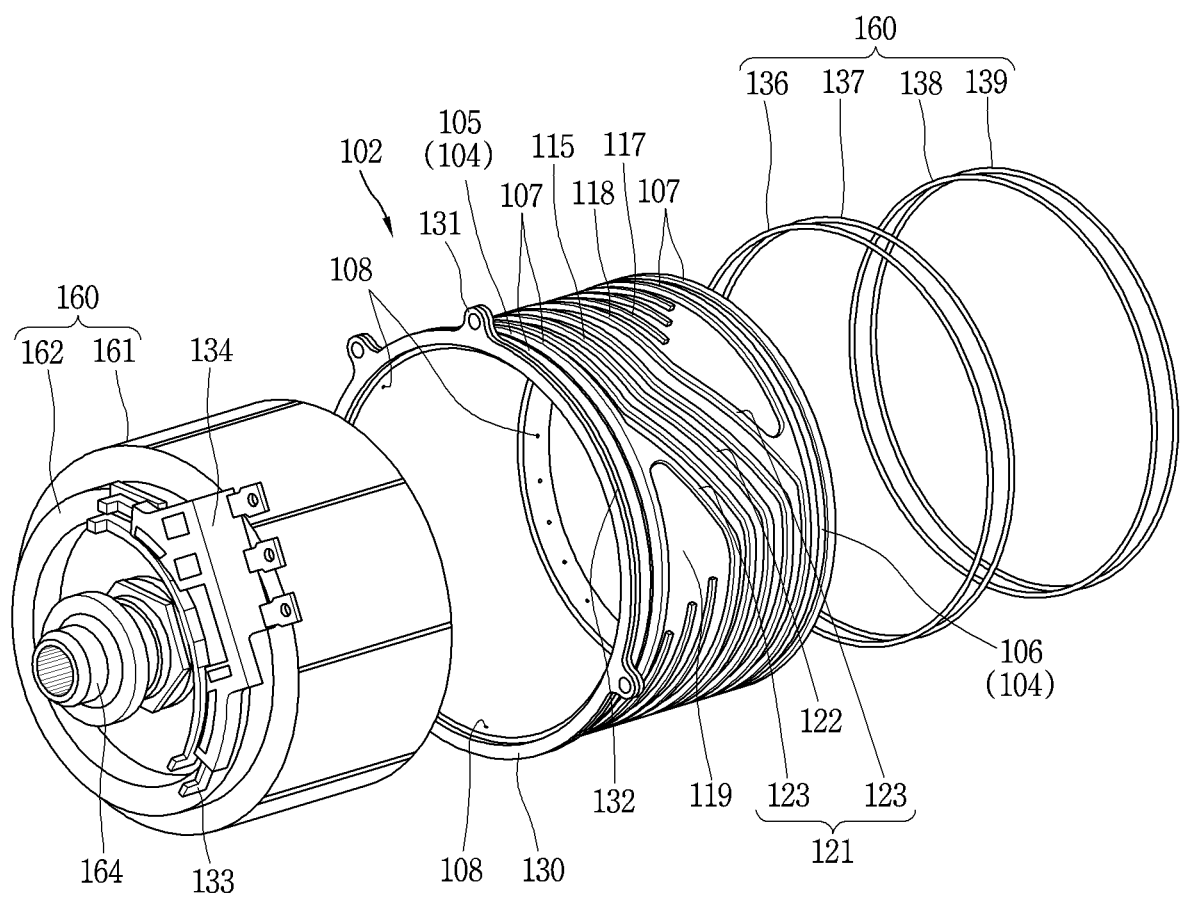
FIG. 5 is a diagram illustrating an exploded view of the inner housing in FIG. 4.
Figure 6:
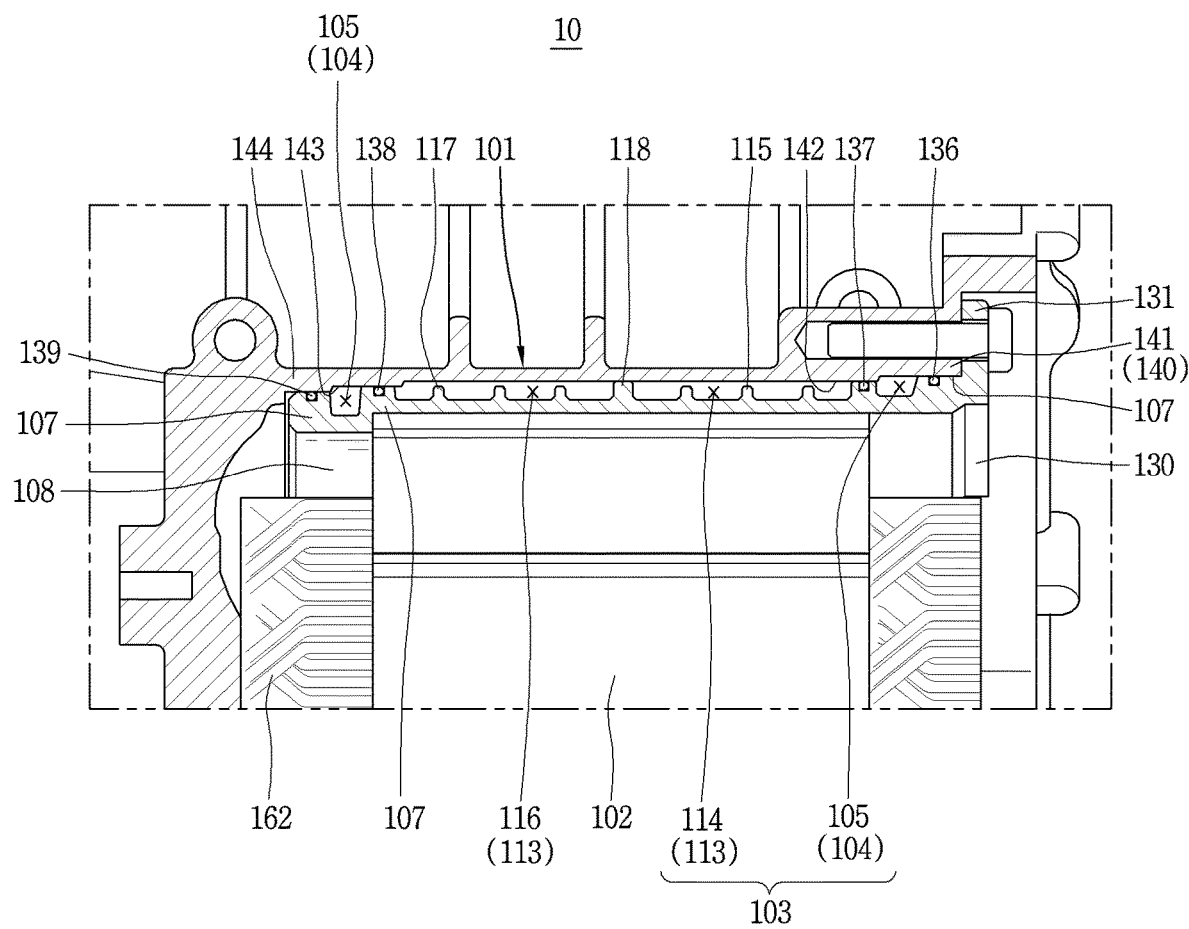
FIG. 6 is a diagram illustrating a cross-sectional view taken along the line VI-VI of FIG. 2.
Figure 7:
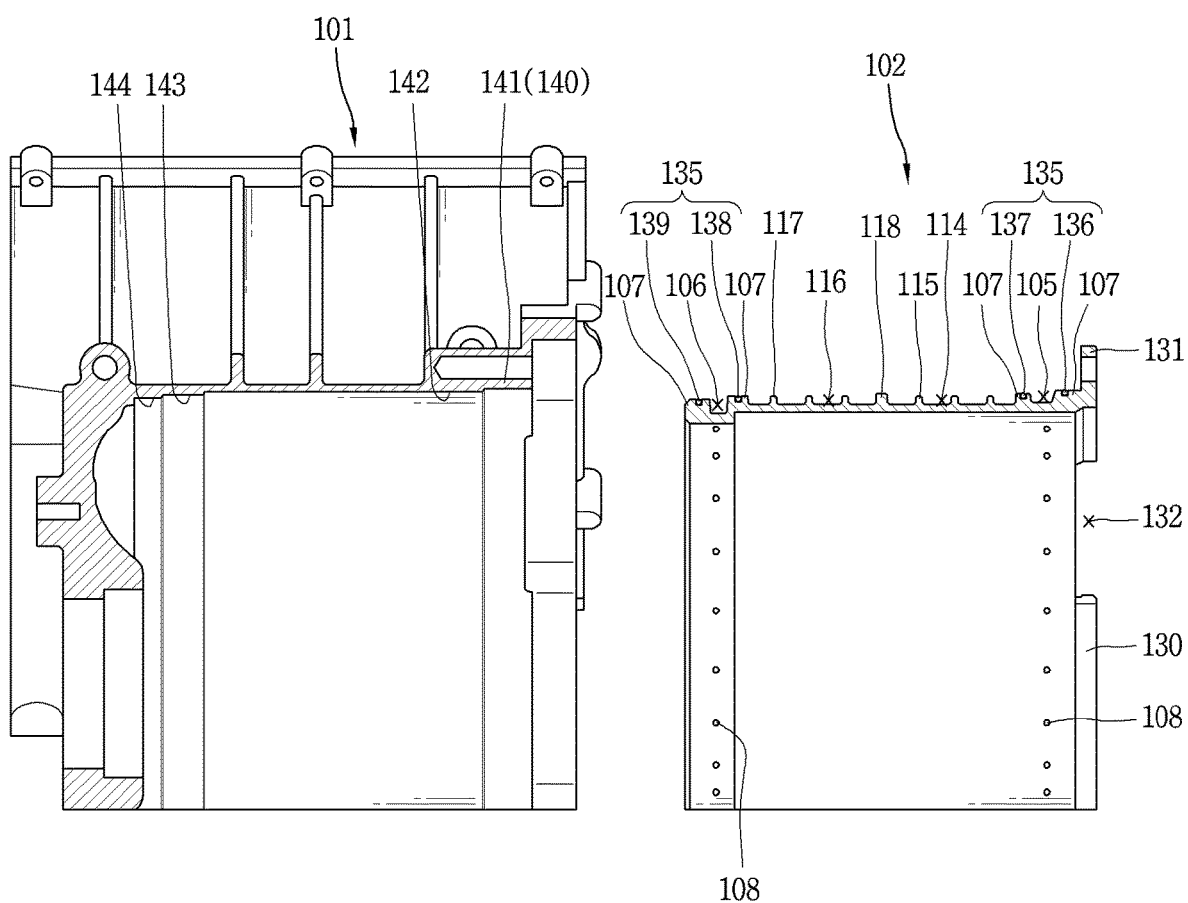
FIG. 7 is a diagram illustrating a conceptual view of a state in which the inner housing is mounted to an inner side of a motor housing in FIG. 6.

FIG. 1 is a diagram illustrating an exemplary intelligent power generation module (IPGM), FIG. 2 is a diagram illustrating the exemplary IPGM in FIG. 1, viewed from another angle, FIG. 3 is a diagram illustrating an exploded view of the exemplary IPGM in FIG. 1, FIG. 4 is a diagram illustrating a perspective view of a state in which a stator 160 and a rotor 163 are mounted inside an inner housing 102 in FIG. 3, FIG. 5 is a diagram illustrating an exploded view of FIG. 4, FIG. 6 is a diagram illustrating a cross-sectional view taken along the line VI-VI of FIG. 2, and FIG. 7 is a diagram illustrating a conceptual view of a state in which the inner housing 102 is mounted to an inner side of a motor housing 101 in FIG. 6.

Figure 8:
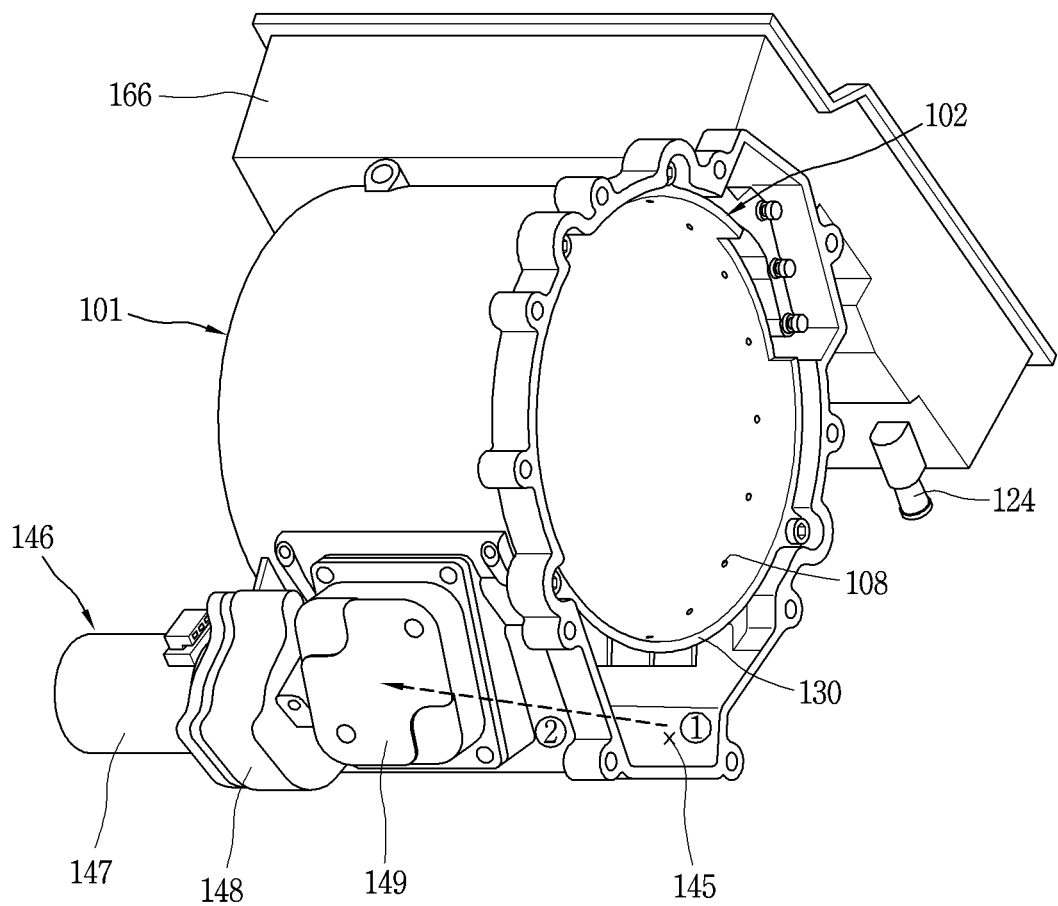
FIG. 8 is a diagram illustrating a conceptual view of a movement path of oil in an oil sump provided on a bottom surface of the motor housing of FIG. 3.
Figure 9:
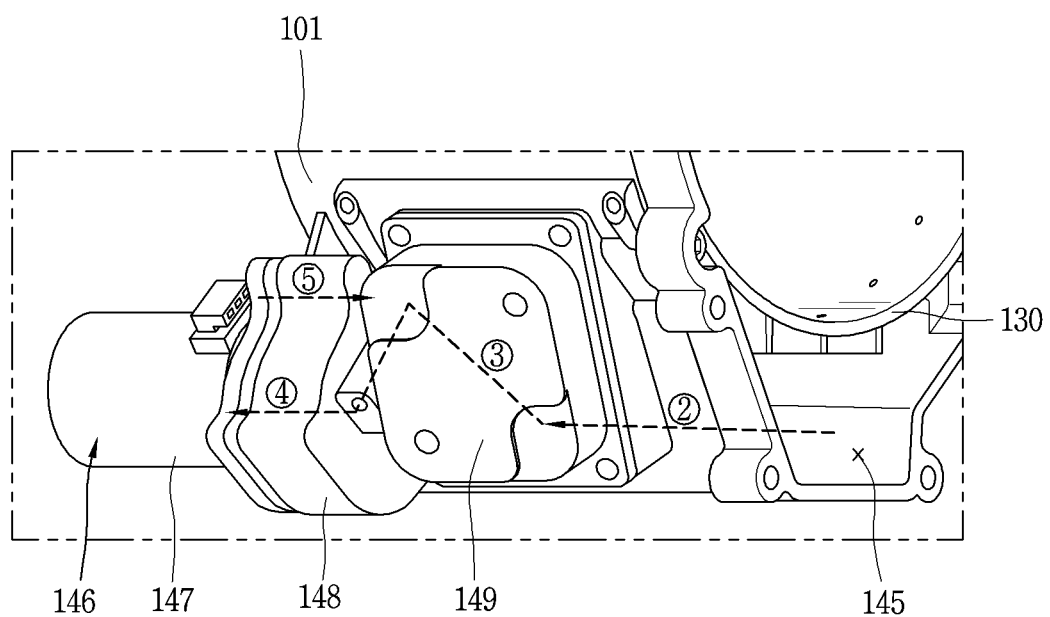
FIG. 9 is a diagram illustrating a conceptual view of an oil path moving from an oil pump of FIG. 8 to a heat exchanger.
Figure 10:
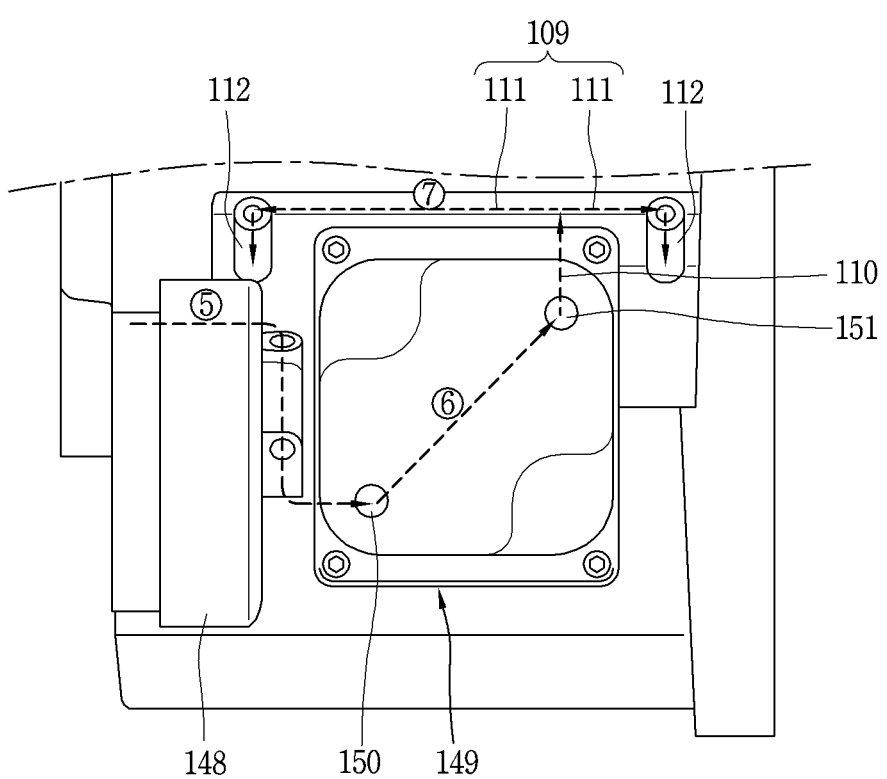
FIG. 10 is a diagram illustrating a conceptual view of an oil path moving from the heat exchanger of FIG. 9 to an oil distributer of a motor housing.
Figure 11:
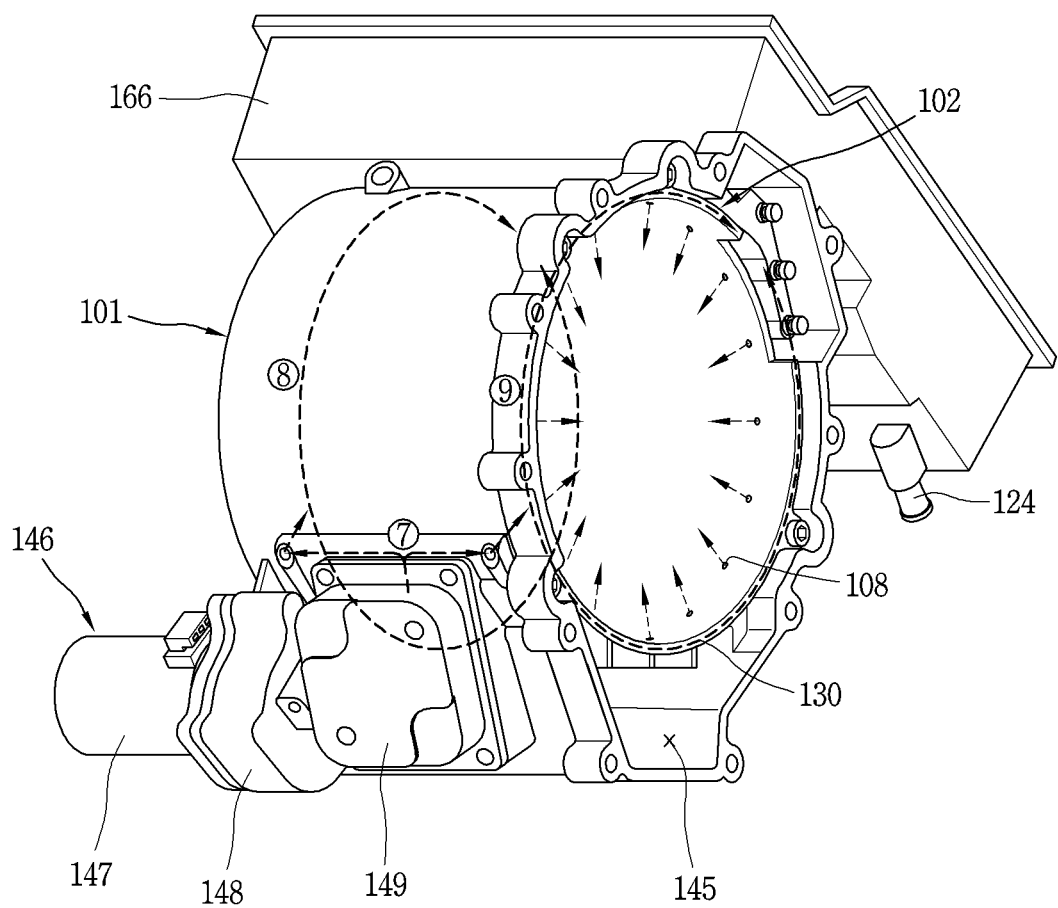
FIG. 11 is a diagram illustrating a conceptual view of a state in which oil heat-exchanged in FIG. 10 is radially sprayed to all sections of 360 degrees in an inner housing through a plurality of injection nozzles.

FIG. 8 is a diagram illustrating a conceptual view of a movement path of oil in an oil sump 145 formed on a bottom surface of the motor housing 101 of FIG. 3, FIG. 9 is a diagram illustrating a conceptual view of an oil path moving from an oil pump of FIG. 8 to a heat exchanger 149, FIG. 10 is a diagram illustrating a conceptual view of an oil path moving from the heat exchanger 149 of FIG. 9 to an oil distributer of the motor housing 101, and FIG. 11 is a diagram illustrating a conceptual view of a state in which oil heat-exchanged in FIG. 10 is radially sprayed to all sections of 360 degrees in the inner housing 102 through a plurality of injection nozzles.

An intelligent power generation module (IPGM) can include an electric motor 10, an inverter 165, and a gearbox 171.

The electric motor 10 can include a stator 160 and a rotor 163 to generate power.

The stator 160 and the rotor 163 can be received inside a motor housing 101. The motor housing 101 can have a cylindrical shape. An accommodation space for accommodating the stator 160 and the rotor 163 can be defined in the motor housing 101. An oil sump 145 can be defined at a lower surface of the motor housing 101. The oil sump 145 can be in fluid communication with the accommodation space of the motor housing 101 and can temporarily store oil.

The stator 160 can include a stator core 161 and a stator coil 162. The stator coil 162 can be wound around slots that are spaced apart from one another in a circumferential direction of the stator core 161. Parts of the stator coil 162 can protrude axially to both ends of the stator core 161 oriented in a lengthwise (longitudinal) direction of the stator core 161. The parts of the stator coil 162 protruding to the both ends of the stator core 161 may refer to end turns.

The stator coil 162 can be configured as a three-phase (U, W, and V-phase) coil and can be connected to a three-phase AC power source. A connection ring 133 that includes busbars for connecting a power connector 134 for applying power to the three-phase coils of the stator coil 162 to neutral lines disposed on ends of the three-phase coils may be mounted to the stator coil 162.

The power connector 134 can have three-phase terminals. The power connector 134 can be integrally formed with the connection ring 133.

The rotor 163 can be rotatably disposed in the stator core 161 with an air gap therebetween. The rotor 163 can include a rotor core and permanent magnets. A rotating shaft 164 can be coupled to the rotor core to rotate together with the rotor core.

Both end portions of the rotating shaft 164 can be rotatably supported by bearings.

A resolver can be disposed on a first side of the rotating shaft 164 in a longitudinal direction of the rotating shaft 164.

A second side of the rotating shaft 164 can be connected to a driving shaft of the gearbox 171.

The gearbox 171 can include a gearbox housing 172 and gears provided inside the gearbox housing 172. The gears can be configured to reduce the number of turns occurred in the rotating shaft 164 of the electric motor 10 and increase a torque. The gears can be configured as a planetary gear set. The planetary gear set can include a ring gear, a sun gear, a planetary gear, a carrier, and the like.

The motor housing 101 can have a cylindrical shape. The motor housing 101 may define an opening at a first side in the longitudinal direction and have a closed surface at a second side.

The opening at the first side of the motor housing 101 can be covered by the gearbox housing 172. A coupling portion 131 can protrude from one side of the motor housing 101 in a radial direction, to be coupled to the gearbox housing 172.

A resolver cover 173 can be coupled to the second side of the motor housing 101 to cover a resolver.

The inverter 165 can operate the electric motor 10 by including a capacitor 169 and an insulated gate bipolar transistor (IGBT) 170.

The inverter housing 166 can be integrally formed in a rectangular shape on one side of a circumferential surface of the motor housing 101. The inverter housing 166 can extend to be inclined in a tangential direction with respect to the circumferential surface of the motor housing 101.

The motor housing 101 and the inverter housing 166 can be integrally formed with each other, so that the electric motor 10 and the inverter 165 can be integrated.

An upper portion of the inverter housing 166 can have an opening, and an inverter cover 167 can be coupled to the upper opening of the inverter housing 166. A plurality of coupling portions can be disposed in a spacing manner on an edge of each of the inverter housing 166 and the inverter cover 167, and coupling members such as screws can be coupled to the plurality of coupling portions.

An inverter assembly such as the capacitor 169 and the IGBT 170 can be accommodated inside the inverter housing 166.

A cap sealing plate 168 can be disposed at an inner bottom surface of the inverter housing 166.

The stator 160 and the rotor 163 can be accommodated through the opening of the motor housing 101.

The inner housing 102 can be mounted in the motor housing 101. The inner housing 102 can have openings at both sides in the longitudinal direction. A plurality of coupling portions 131 can be provided on one side of the inner housing 102 in the longitudinal direction.

The plurality of coupling portions 131 can protrude radially outward from the inner housing 102.

The plurality of coupling portions 131 can be spaced apart from one another in the circumferential direction of the inner housing 102. Each of the plurality of coupling portions 131 can define a coupling hole through which a coupling member such as a screw can be inserted to couple all of the gearbox housing 172, the inner housing 102, and the motor housing 101.

The stator core 161 can be press-fitted into the inner housing 102.

An end part 130 can extend from an edge portion of one end of the inner housing 102 in the circumferential direction, and the plurality of coupling portions 131 can extend from the end part 130 in the radial direction. The end part 130 can connect the plurality of coupling portions 131.

A cutout portion 132 can be formed in a preset section (an upper right section of the inner housing 102; a section corresponding to 30 to 50 degrees) along the circumferential direction of the end part 130. The cutout portion 132 can be configured to avoid interference with the power connector 134 extending radially outward from the connection ring 133 and to couple the power connector 134 and the end part 130 to each other.

An oil pump mounting portion 148 can protrude from an outer surface of the motor housing 101 in the radial direction. An oil pump 146 can be installed in the oil pump mounting portion 148 so that a pump shaft of the oil pump 146 can extend in parallel to the longitudinal direction of the motor housing 101.

The oil pump 146 can be configured to circulate oil in the motor housing 101.

An oil pump housing 147 can be mounted to protrude from the oil pump mounting portion 148 in an opposite direction to the gearbox 171 of the motor housing 101.

A heat exchanger 149 can be installed on one side of the outer surface of the motor housing 101. The heat exchanger 149 can be configured to cool down oil in a water-cooling manner. A cooling water flow path and an oil flow path can be defined in a heat exchanger housing. Accordingly, cooling water flowing along the cooling water flow path and oil flowing along the oil flow path may exchange heat with each other, such that the oil can be cooled down by the cooling water.

An oil flow path inlet 150 of the heat exchanger 149 can be connected to a pump outlet of the oil pump 146. An oil flow path outlet 151 of the heat exchanger 149 can be connected to an oil channel 104. The oil flow path inlet 150 and the oil flow path outlet 151 can be disposed to be spaced apart from each other at a lower rear corner portion and an upper front corner portion of the heat exchanger housing in a diagonal direction. The oil flow path can extend from the lower rear corner portion to the upper front corner portion of the heat exchanger housing.

The oil flow path of the heat exchanger 149 may be defined (disposed) in the heat exchanger housing toward the radial outside of the motor housing 101, and the cooling water flow path of the heat exchanger 149 may be defined in the heat exchanger housing toward the motor housing 101.

The oil sump 145 can be connected to a pump inlet of the oil pump 146 by an oil sump pipe.

Oil in the oil sump 145 can be suctioned into the oil pump 146. The oil pumped by the oil pump 146 can move to the heat exchanger 149 to exchange heat with cooling water, thereby dissipating heat to the cooling water.

A dual flow path 103 can be defined on the same circumferential surface of the inner housing 102. The dual flow path 103 can include a plurality of oil channels 104 and a plurality of water channels 113.

The dual flow path 103 of the inner housing 102 can be provided by die-casting.

The plurality of oil channels 104 can extend in the circumferential direction of the inner housing 102. A first oil channel 105 of the plurality of oil channels 104 can be disposed at the front end portion of the inner housing 102 to be adjacent to the plurality of coupling portions 131. A second oil channel 106 of the plurality of oil channels 104 can be disposed at the rear end portion of the inner housing 102 in a direction opposite to the plurality of coupling portions 131.

A plurality of oil flow path forming protrusions 107 can protrude radially outward from the circumferential surface of the inner housing 102. The oil flow path forming protrusions 107 can radially protrude along the circumferential direction with the oil channel 104 interposed therebetween.

The plurality of oil flow path forming protrusions 107 can define the oil channel 104. Upper end portions (outermost end portions) of the plurality of oil flow path forming protrusions 107 can be brought into contact with an inner circumferential surface of the motor housing 101.

Each of the plurality of oil flow path forming protrusions 107 can be provided with an O-ring 135. Each of the plurality of oil flow path forming protrusions 107 can be provided with an O-ring mounting groove defined in the circumferential direction. The plurality of O-rings 135 can hermetically seal the oil channel 104. The plurality of O-rings 135 can partition the oil channel 104 and the water channel 113 from each other. Accordingly, oil flowing along the oil channel 104 can be blocked from being mixed with cooling water.

The plurality of O-rings 135 can include a first O-ring 136 and a second O-ring 137 disposed at the front end portion (adjacent to the coupling portions 131) of the inner housing 102, based on a press-fitted direction of the stator 160, and a third O-ring 138 and a fourth O-ring 139 disposed at the rear end portion (opposite to the coupling portions 131) of the inner housing 102.

The first O-ring 136 can be disposed closest to the coupling portions 131 among the first O-ring 136, the second O-ring 137, the third O-ring 138, and the fourth O-ring 139 and mounted to an outer end portion of an oil flow path forming protrusion 107 having the largest diameter. An O-ring mounting groove can be formed in the outer end portion of the oil flow path forming protrusion 107 having the largest diameter in the circumferential direction.

The second O-ring 137 can be spaced apart from the first O-ring 136 in the longitudinal direction of the inner housing 102 by a flow path width of the oil channel 104, and mounted to an outer end portion of an oil flow path forming protrusion 107 having the second largest diameter. The second O-ring 137 can have a diameter that is smaller than the diameter of the first O-ring 136.

The third O-ring 138 can be spaced apart from the second O-ring 137 in the longitudinal direction of the inner housing 102 by a width of the plurality of water channels 113, and mounted to an outer end portion of an oil flow path forming protrusion 107 having the third largest diameter among the plurality of oil flow path forming protrusions 107 defining the oil channel 104. The third O-ring 138 can have a diameter that is smaller than the diameter of the second O-ring 137.

The fourth O-ring 139 can be spaced apart from the third O-ring 138 in the longitudinal direction of the inner housing 102 by a width of the second oil channel 106, and mounted to an outer end portion of an oil flow path forming protrusion 107 having the smallest diameter among the plurality of oil flow path forming protrusions 107 defining the oil channel 104. The fourth O-ring 139 can have a diameter that is smaller than the diameter of the third O-ring 138.

A plurality of stepped portions 140 can be provided on an inner circumferential surface of the motor housing 101. The plurality of stepped portions 140 can be spaced apart from one another in the longitudinal direction of the motor housing 101. Based on a direction in which the inner housing 102 is inserted into the motor housing 101, a first stepped portion 141 and a second stepped portion 142 having different diameters can be provided at the front end portion of the motor housing 101, and a third stepped portion 143 and a fourth stepped portion 144 having have different diameters can be provided at the rear end portion of the motor housing 101.

The first stepped portion 141 can be disposed closest to the coupling portion 131 of the inner housing 102 among the first stepped portion 141, the second stepped portion 142, the third stepped portion 143, and the fourth stepped portion 144, and the second stepped portion 142 can extend from the first stepped portion 141 toward the inside of the motor housing 101 in the axial direction to have a diameter smaller than that of the first stepped portion 141. The third stepped portion 143 can extend from a rear end of the second stepped portion 142 toward the inside of the motor housing 101 in the axial direction to have a diameter smaller than that of the second stepped portion 142, and the fourth stepped portion 144 can extend from a rear end of the third stepped portion 143 toward the inside of the motor housing 101 to have a diameter smaller than that of the third stepped portion 143.

In some implementations, the first stepped portion 141 to the fourth stepped portion 144 can overlap and come in contact with the first O-ring 136 to the fourth O-ring 139 in the radial direction, respectively, thereby allowing sealing between the oil channels 104 and the water channels 113.

In addition or alternatively, the diameter of the stepped portion 140 may be reduced from the first stepped portion 141 to the fourth stepped portion 144, that is, toward the inside of the motor housing 101, and the diameter of the O-ring 135 may be reduced from the first and second O-rings 136 and 137 to the third and fourth O-rings 138 and 139, that is, toward the rear end portion of the inner housing 102. Accordingly, when the inner housing 102 is inserted into the motor housing 101, the time for which each O-ring 135 comes in contact with the motor housing 101 can be minimized, thereby blocking the O-ring 135 from being separated from the O-ring mounting groove of the inner housing 102 due to friction with the motor housing 101.

A plurality of injection nozzles 108 can be provided at an inner side of the oil channel 104 in a radially penetrating manner. The plurality of injection nozzles 108 can be spaced apart from one another in the circumferential direction of the inner housing 102. The plurality of injection nozzles 108 can spray oil in the entire section (360 degrees) along the circumferential direction of the inner housing 102.

Each of the plurality of injection nozzles 108 can have a first side that is in fluid communication with the oil channel 104 and a second side that is in fluid communication with the inner space of the inner housing 102.

Oil can be sprayed toward the end turn of the stator coil 162 in the entire section of the inner housing 102 in the circumferential direction through the plurality of injection nozzles 108.

An oil supply part 109 can be provided in the motor housing 101 to supply oil cooled down through the heat exchanger 149 to the plurality of injection nozzles 108.

The oil supply part 109 can include a supply flow path 110, a distribution flow path 111, and a plurality of communication flow paths 112.

One side of the supply flow path 110 can be in fluid communication with the oil flow path outlet 151 of the heat exchanger 149, and another side of the supply flow path 110 can be in fluid communication with the distribution flow path 111. An oil distribution flow path 111 can extend in the circumferential direction of the motor housing 101.

The distribution flow path 111 can extend in the longitudinal direction of the motor housing 101. A middle portion of the distribution flow path 111 in the longitudinal direction can be in fluid communication with the supply flow path 110, and both end portions of the distribution flow path 111 in the longitudinal direction can be in fluid communication with the communication flow paths 112.

The distribution flow path 111 can be configured to distribute oil supplied from the supply flow path 110 to both end portions of the motor housing 101 in the longitudinal direction.

Each of the plurality of communication flow paths 112 can extend to the inside of the motor housing 101 in the radial direction. Outer sides of the communication flow paths 112 can be in fluid communication with end portions of the distribution flow path 111, and inner sides of the communication flow paths 112 can be in fluid communication with the oil channel 104.

Each of the plurality of communication flow paths 112 can be defined at a higher position than the oil flow path outlet 151 of the heat exchanger 149. For example, each of the plurality of communication flow paths 112 can be defined above the oil flow path outlet 151 of the heat exchanger 149.

The oil channel 104 can have a circular ring shape from the communication flow paths 112. The oil channel 104 can be open radially outward and can have a cross-sectional shape like "U". An inner edge of the oil channel 104 can be rounded.

A flow rate of oil can be diverged in half into the communication flow paths 112. Each diverged half of the oil can flow to an opposite direction along the oil channel 104 to merge at an opposite side.

For example, a half of oil introduced into the communication flow paths 112 can move clockwise along a semicircle of the oil channel 104, and another half of the oil may move counterclockwise along another semicircle of the oil channel 104, thereby merging with each other at a point spaced 180 degrees apart from the communication flow paths 112.

Oil flowing along the oil channel 104 can flow out in the radial direction through the plurality of injection nozzles so as to be sprayed onto the end turn of the stator coil 162.

The oil can absorb heat generated by the stator coil 162 and can be collected in the oil sump 145.

The oil collected in the oil sump 145 can be suctioned by the oil pump 146, cooled down in the heat exchanger 149, and then recirculated to the oil channel 104 between the motor housing 101 and the inner housing 102.

Figure 12:
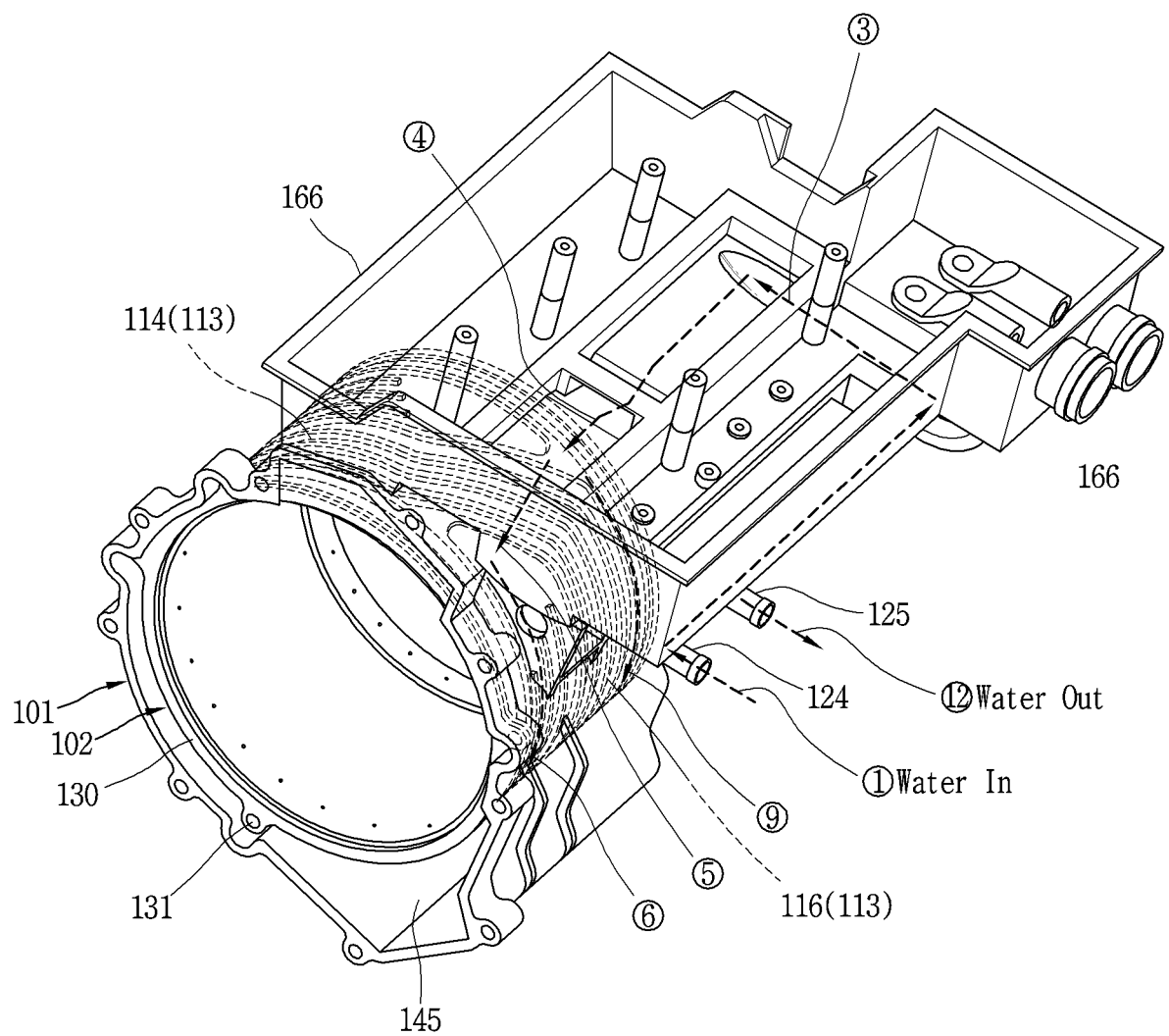
FIG. 12 is a diagram illustrating a conceptual view of a cooling water inlet port formed at an inverter housing and a cooling water outlet port formed at a motor housing in FIG. 11.
Figure 13:
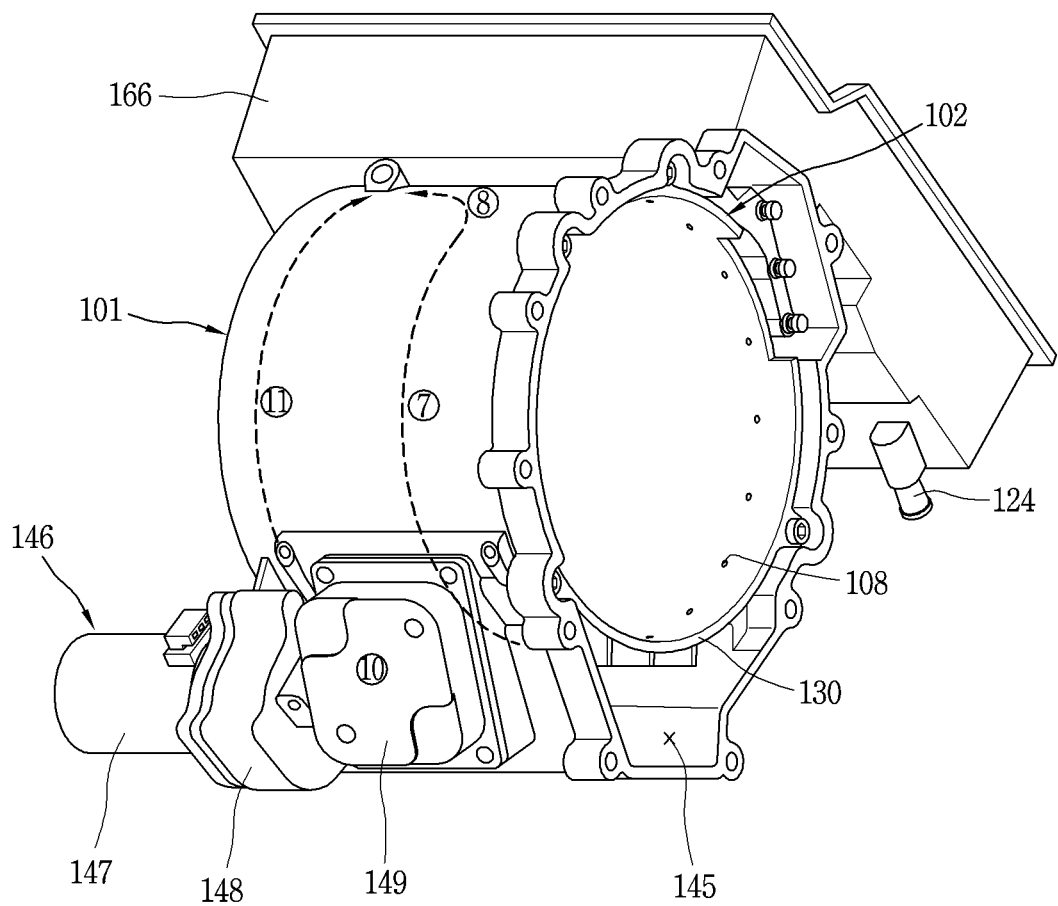
FIG. 13 is a diagram illustrating a conceptual view of a movement path of cooling water, viewed from an opposite side of FIG. 12.
Figure 14:
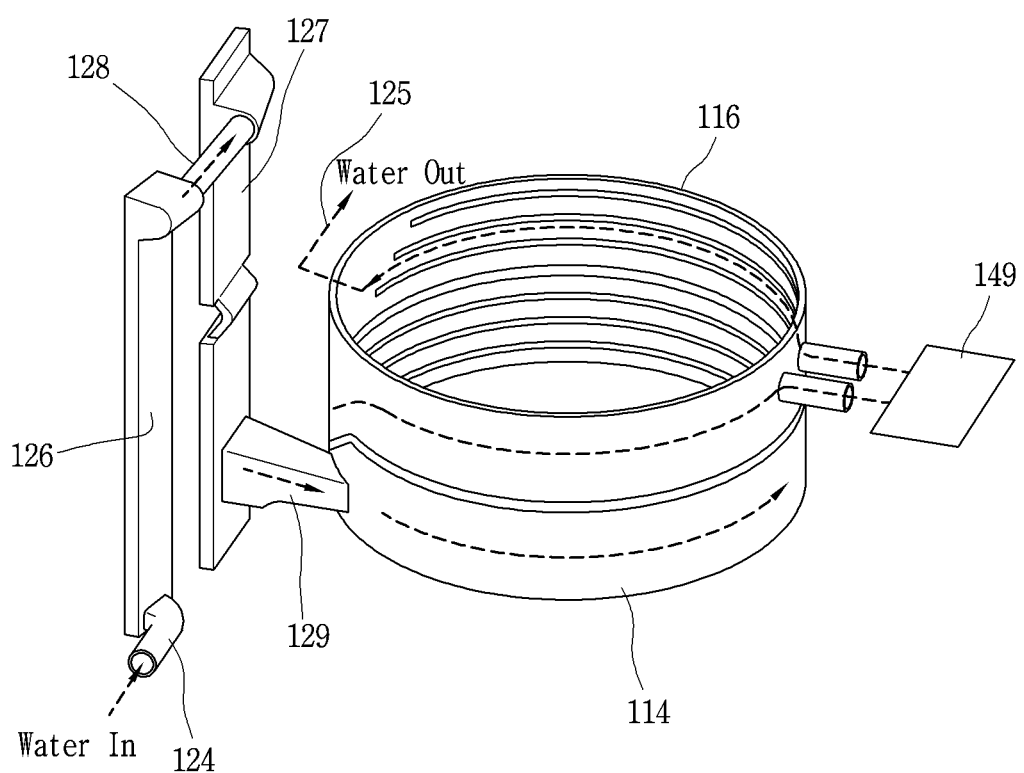
FIG. 14 is a diagram illustrating a conceptual view of a cooling water movement path in an inverter housing and a motor housing.

FIG. 12 is a diagram illustrating a conceptual view of a cooling water inlet port 124 formed at the inverter housing 166 and a cooling water outlet port 125 formed at the motor housing 101 in FIG. 11, FIG. 13 is a diagram illustrating a conceptual view of a movement path of cooling water, viewed from an opposite side of FIG. 12, and FIG. 14 is a diagram illustrating a conceptual view of a cooling water movement path in the inverter housing 166 and the motor housing 101.

A cooling water inlet port 124 can be provided at one side of the inverter housing 166, and a cooling water outlet port 125 can be provided on one side of the motor housing 101.

The cooling water inlet port 124 can extend toward a lower surface of the inverter housing 166 in a direction intersecting with the circumferential direction of the motor housing 101.

The cooling water outlet port 125 can extend in a tangential direction toward an uppermost end of the circumferential surface of the motor housing 101.

The cooling water inlet port 124 and the cooling water outlet port 125 can be spaced apart from each other in the longitudinal direction of the motor housing 101.

The cooling water inlet port 124 can be disposed at the front of the inverter housing 166 based on the direction in which the inner housing 102 is inserted into the motor housing 101, and the cooling water outlet port 125 can be spaced apart from the cooling water inlet port 124 in the longitudinal direction of the motor housing 101.

The cooling water inlet port 124 can be provided on the lower surface in the height direction of the inverter housing 166, and the cooling water outlet port 125 can be located below the cooling water inlet port 124 and located at the uppermost end in the radial direction of the motor housing 101.

A capacitor cooling plate 126 can be mounted on an inner bottom surface of the inverter housing 166. A cooling flow path through which cooling water flows can be provided in the capacitor cooling plate 126. The capacitor cooling plate 126 can extend in the longitudinal direction of the inverter housing 166.

The cooling water inlet port 124 can communicate with one side of the capacitor cooling plate 126.

An IGBT cooling plate 127 can be mounted on the inner bottom surface of the inverter housing 166. A cooling flow path through which cooling water flows can be provided in the IGBT cooling plate 127. The IGBT cooling plate 127 can extend in the longitudinal direction of the inverter housing 166 to be in parallel with the capacitor cooling plate 126.

An inner flow path 128 can connect another side of the capacitor cooling plate 126 to one side of the IGBT cooling plate 127, so that cooling water can flow from the capacitor cooling plate 126 to the IGBT cooling plate 127. An inner flow path 128 can extend in an intersecting direction with the longitudinal direction of the motor housing 101.

A motor housing connecting portion 129 can extend downward from another side of the IGBT cooling plate 127 to provide fluid communication to a first water channel 114 of the motor housing 101. Cooling water may move from the inverter housing 166 into the motor housing 101 through the motor housing connecting portion 129.

The plurality of water channels 113 can extend at the inner housing 102 in the circumferential direction. The plurality of water channels 113 can be provided between the plurality of oil channels 104. The plurality of water channels 113 can be formed in the circumferential direction.

The plurality of water channels 113 can include a plurality of first water channels 114 and a plurality of second water channels 116.

The plurality of first water channels 114 can be disposed at the front portion of the inner housing 102 (half of the total length of the inner housing 102) toward the coupling portions 131, and extend in the circumferential direction.

A plurality of first flow path forming protrusions 115 can protrude in the radial direction of the inner housing 102 and extend in the circumferential direction to define the plurality of first water channels 114. The plurality of first flow path forming protrusions 115 and the plurality of first water channels 114 can be alternately disposed in the longitudinal direction of the inner housing 102.

Outer ends of the plurality of first flow path forming protrusions 115 can be disposed with a gap from the inner surface of the motor housing 101.

The plurality of first flow path forming protrusions 115 can guide cooling water to move along the circumferential direction of the first water channels 114.

Each of the plurality of second water channels 116 can be disposed at the rear portion of the inner housing 102 in a direction opposite to the coupling portions 131, and can extend in the circumferential direction.

A plurality of second flow path forming protrusions 117 can protrude in the radial direction of the inner housing 102 and extend in the circumferential direction to define the plurality of second water channels 116. The plurality of second flow path forming protrusions 117 and the plurality of second water channels 116 can be alternately disposed in the longitudinal direction of the inner housing 102.

An intermediate partition wall 118 can be disposed between the first water channel 114 and the second water channel 116. The intermediate partition wall 118 can protrude in the radial direction of the inner housing 102 and can extend in the circumferential direction. The intermediate partition wall 118 can partition the first water channel 114 and the second water channel 116.

In some implementations, an outer end of the intermediate partition wall 118 in the radial direction can contact the motor housing 101 (see FIG. 6).

An inflow-side common header 119 can be disposed at one side of the first water channel 114.

The inflow-side common header 119 can be in fluid communication with one end (start point) of each of the plurality of first water channels 114, to distribute cooling water introduced through one cooling water inlet port 124 into the plurality of first water channels 114. The plurality of first water channels 114 may start at different locations in the circumferential direction of the inner housing 102.

The plurality of first water channels 114 can be configured such that cooling water can enter the first water channels 114 in the order of the rearmost first water channel 114, based on a direction in which the stator 160 is press-fitted into the inner housing 102, to the foremost first water channel 114 from the inflow-side common header 119.

For example, the foremost first flow path forming protrusion 115 in the longitudinal direction of the inner housing 102 among the plurality of first flow path forming protrusions 115 can extend from a point spaced the farthest apart from the inflow-side common header 119 in the circumferential direction, and the remaining first flow path forming protrusions 115 can extend from locations that are gradually adjacent to the inflow-side common header 119 in the circumferential direction.

An outflow-side common header 120 can be disposed at one side of the second water channel 116.

The outflow-side common header 120 can be disposed on the outer circumferential surface of the inner housing 102 to be spaced apart from the inflow-side common header 119 in the circumferential and longitudinal directions (diagonal directions).

The outflow-side common header 120 can be configured to collect cooling water flowing along the plurality of second water channels 116 and then discharge the collected cooling water through one cooling water outlet port 125.

The plurality of second flow path forming protrusions 117 that are in fluid communication with the outflow-side common header 120 can have different extension lengths in the circumferential direction.

For example, a second flow path forming protrusion 117 disposed adjacent to the intermediate partition wall 118 may have the longest extension length toward the outflow-side common header 120, and the remaining second flow path forming protrusions 117 spaced farther apart from the intermediate partition wall 118 may have shorter extension lengths toward the outflow-side common header 120.

A water channel connecting part 121 can be provided in the inner housing 102 such that cooling water can move from the first water channels 114 to the second water channels 116. The water channel connecting part 121 can be configured to connect flow-end points of the first water channels 114 in the circumferential direction and flow-start points of the second water channels 116 in the circumferential direction.

For example, the water channel connecting part 121 can include a plurality of flow path forming protrusion connecting portions 122 and a plurality of intermediate partition wall connecting portions 123 for connecting the first water channels 114 and the second water channels 116 that are spaced apart from each other in the longitudinal direction of the inner housing 102.

The plurality of flow path forming protrusion connecting portions 122 can extend obliquely in the longitudinal and circumferential directions of the inner housing 102 from the flow-end points of the first water channels 114 toward the flow-start points of the second water channels 116, thereby connecting the plurality of first flow path forming protrusions 115 of the first water channels 114 and the plurality of second flow path forming protrusions 117 of the second water channels 116 to each other.

The plurality of intermediate partition wall connecting portions 123 can be disposed at both sides in a direction crossing the plurality of flow path forming protrusion connecting portions 122 with the plurality of flow path forming protrusion connecting portions 122 interposed therebetween.

A first intermediate partition wall connecting portion 123 of the plurality of intermediate partition wall connecting portions 123 can extend obliquely in the longitudinal and circumferential directions of the inner housing 102 from the oil flow path forming protrusion 107 defining a boundary between the first oil channel 105 (located at the front of the inner housing 102) and the first water channel 114, and may then be connected to the intermediate partition wall 118, thereby partitioning the inflow-side common header 119 and the water channel connecting part 121 from each other.

A second intermediate partition wall connecting portion 123 of the plurality of intermediate partition wall connecting portions can extend obliquely in the longitudinal and circumferential directions of the inner housing 102 from the intermediate partition wall 118 and may then be connected to the flow path forming protrusion constituting a boundary between the second oil channel 106 (located at the rear of the inner housing 102) and the second water channel 116, thereby partitioning the water channel connecting part 121 and the outflow-side common header 120 from each other.

An outflow-side heat exchanger connecting portion and an inflow-side heat exchanger connecting portion can be provided on the second water channel 116.

Each of the outflow-side heat exchanger connecting portion and the inflow-side heat exchanger connecting portion can be in fluid communication with the cooling water flow path of the heat exchanger 149. Cooling water may move from the second water channel 116 to the heat exchanger 149 through the outflow-side heat exchanger connecting portion, exchange heat with oil in the heat exchanger 149, and move from the heat exchanger 149 into the second water channel 116 through the inflow-side heat exchanger connecting portion.

The cooling water outlet port 125 can be provided at the motor housing 101 and can be in fluid communication with an upper portion of the second water channel 116, so as to be discharged from the inside of the motor housing 101 to the outside through the cooling water outlet port 125.

The cooling water inlet port 124 and the cooling water outlet port 125 can be connected to a cooling water circulation system.

The cooling water circulation system can include a radiator installed at the front of an electric vehicle, a cooling water circulation line connecting the cooling water inlet port 124 and the cooling water outlet port 125 to the radiator, and a water pump for circulating cooling water. Cooling water can move from the cooling water outlet port 125 to the radiator along the cooling water circulation line, emit heat to air suctioned into the radiator, and then recirculate back to the cooling water inlet port 124 along the cooling water circulation line.

The cooling water can flow into the inverter housing 166 through the cooling water inlet port 124 to cool the capacitor 169 and the IGBT 170, and then flow into the motor housing 101 to cool the electric motor 10 while flowing along the first water channels 114 and the second water channels 116.

The cooling water can move from the second water channels 116 to the heat exchanger 149 to cool oil, and then move back to the second water channels 116 to flow out through the cooling water outlet port 125.

Afterwards, the cooling water may emit heat to air in the radiator while moving along the cooling water circulation line, and then recirculate back to the inverter housing 166 through the cooling water inlet port 124.

Figure 15:
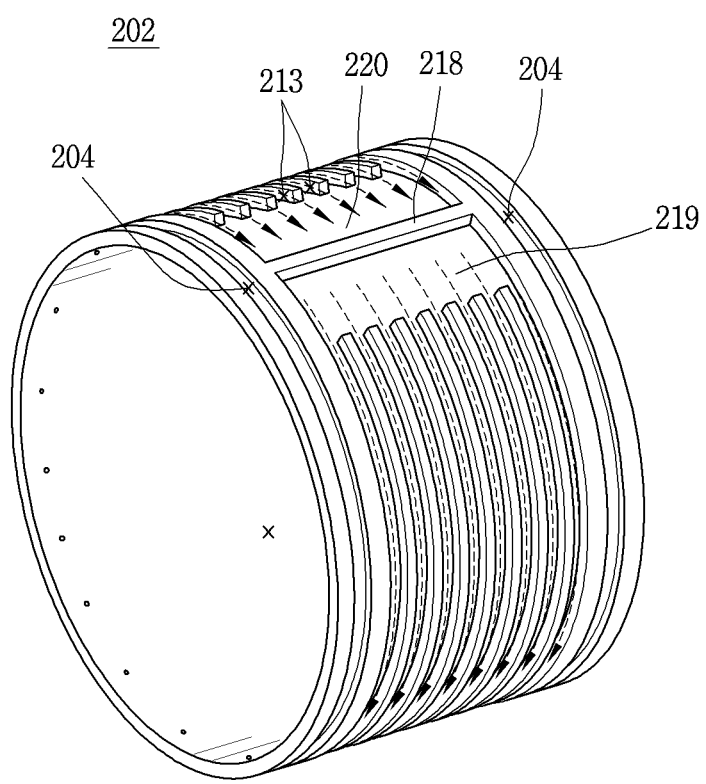
FIG. 15 is a diagram illustrating a conceptual view of a dual flow path structure of an inner housing.

FIG. 15 is a diagram illustrating a conceptual view of a dual flow path structure of an inner housing 202.

In some implementations, the inner housing 202 can include a plurality of water channels 213 disposed between a plurality of oil channels 204, and each of the plurality of water channels 213 has a circumferential direction but the flow of cooling water may start at the same first point and ends at the same second point along the circumferential direction in each of the plurality of water channels 213.

In some implementations, the first water channel 114 and the second water channel that are spaced apart in the longitudinal direction of the inner housing 102 can be disposed in the front and rear portions of the inner housing 102 in the longitudinal direction, respectively, and the water channel connecting part 121 for connecting the first and second water channels 114 and 116 can be provided in the inner housing 102.

In some implementations, cooling water can rotate by one round (rotates by 360 degrees) along the plurality of water channels 213 without distinction between the first and second water channels.

For example, an inflow-side common header 219 can be disposed as the first point and an outflow-side common header 220 can be disposed as the second point on an upper portion of the inner housing 202.

The inflow-side common header 219 and the outflow-side common header 220 can each extend along the longitudinal direction of the inner housing 202 and can be spaced apart from each other in the circumferential direction.

A transverse partition wall 218 can extend along the longitudinal direction of the inner housing 202 and can be disposed between the inflow-side common header 219 and the outflow-side common header 220 to partition the inflow-side common header 219 and the outflow-side common header 220 from each other.

What is claimed is:

1. A power generation module comprising:
    an electric motor that includes a motor housing defining an outer periphery of the electric motor;
    an inverter that is disposed at a first side of the motor housing and that includes an inverter housing configured to accommodate an insulated gate bipolar transistor (IGBT) and a capacitor;
    an inner housing that is disposed inside the motor housing and that is configured to accommodate a stator and a rotor; and
    a dual flow path disposed at a circumferential surface of the motor housing on which the inner housing is disposed,
    wherein the dual flow path comprises:
        a plurality of first cooling flow paths spaced apart from each other in a longitudinal direction of the inner housing and through which a first fluid flows,
        a second cooling flow path defined between the plurality of first cooling flow paths and through which a second fluid flows, and
        a plurality of injection nozzles that are disposed at each of the plurality of first cooling flow paths, that are spaced apart from each other, and that are configured to spray the first fluid to an inner space of the inner housing,
    wherein the plurality of first cooling flow paths include a plurality of oil channels extending in a circumferential direction of the inner housing,
    wherein the second cooling flow path comprises:
        a plurality of first water channels disposed at a front portion of the inner housing in the longitudinal direction and extending along the circumferential direction of the inner housing,
        a plurality of second water channels disposed at a rear portion of the inner housing in the longitudinal direction and extending along the circumferential direction of the inner housing, and
        a water channel connecting part extending from a first side of the plurality of first water channels toward the plurality of second water channels in the longitudinal and circumferential directions of the inner housing and provide fluid communication between the plurality of first water channels and the plurality of second water channels, and wherein the inner housing comprises:
        a plurality of first flow path forming protrusions that extend in the circumferential direction of the inner housing and that define the plurality of first water channels,
        a plurality of second flow path forming protrusions that extend in the circumferential direction of the inner housing and that define the plurality of second water channels,
        an intermediate partition wall that extends in the circumferential direction of the inner housing, that protrudes a radial direction of the inner housing, that contacts the motor housing, and that partitions the plurality of first water channels and the plurality of second water channels from each other,
        a flow path forming protrusion connecting portion that extends in the circumferential and longitudinal directions of the inner housing and that connects the plurality of first water channels to the plurality of second water channels, and
        an intermediate partition wall connecting portion that extends from a flow path forming protrusion providing a boundary between one of the plurality of oil channels and the first water channels toward one side of the intermediate partition wall in the circumferential and longitudinal directions or that extend from another side of the intermediate partition wall toward a flow path forming protrusion providing a boundary between another one of the plurality of oil channels and the second water channels in the circumferential and longitudinal directions.

2. The module of claim 1, wherein the first fluid is oil and the second fluid is water.

3. The module of claim 2, further comprising:
    an oil sump that is disposed at an inner lower portion of the motor housing and that is configured to receive the oil; and
    an oil pump that is mounted on a second side of the motor housing and that is configured to circulate the oil in the oil sump to the plurality of injection nozzles.

4. The module of claim 3, further comprising a heat exchanger that is mounted on a third side of the motor housing and that is configured to perform heat-exchange between (i) oil received from the oil pump to be transferred to the plurality of injection nozzles and (ii) water, to cool down the oil.

5. The module of claim 1, wherein the plurality of injection nozzles extend in a radial direction of the inner housing, are spaced apart from each other in the circumferential direction of the inner housing, and are configured to spray the first fluid onto a stator coil of the stator.

6. The module of claim 1, wherein the second cooling flow path comprises a plurality of water channels disposed between the plurality of oil channels that are spaced apart from each other in the longitudinal direction of the inner housing and that extend along the circumferential direction of the inner housing.

7. The module of claim 6, wherein the inner housing further comprises a plurality of O-rings each disposed at both sides of each oil channel to provide sealing between the plurality of oil channels and the plurality of water channels.

8. The module of claim 7, wherein the plurality of O-rings are disposed in a spaced manner in the longitudinal direction of the inner housing, mounted on a concentric circle of the inner housing, and have different diameters,
   wherein the plurality of O-rings include a first O-ring and a second O-ring that are disposed at a first end of the inner housing with respect to the longitudinal direction of the inner housing,
   wherein the plurality of O-rings include a third O-ring and a fourth O-ring that are disposed at a second end of the inner housing,
   wherein a diameter of the second O-ring is less than a diameter of the first O-ring,
   wherein a diameter of the third O-ring is less than the diameter of the second O-ring, and
   wherein a diameter of the fourth O-ring is less than the diameter of the third O-ring.

9. The module of claim 6, wherein the inner housing comprises a plurality of flow path forming protrusions that extend in the circumferential direction of the inner housing and that define the plurality of oil channels or the plurality of water channels.

10. The module of claim 6, wherein the inner housing comprises:
    an inflow-side common header that is defined at an inlet side of the plurality of water channels and that is configured to distribute water to the plurality of water channels, and
    an outflow-side common header defined at an outlet side of the plurality of water channels and that is configured to collect the water from the plurality of water channels.

11. The module of claim 1, wherein the inner housing comprises:
    an inflow-side common header that is defined at an inlet side of the plurality of first water channels and that is configured to distribute water to the plurality of first water channels; and
    an outflow-side common header that is defined at an outlet side of the plurality of second water channels and that is configured to collect the water from the plurality of second water channels.

12. The module of claim 1, further comprising:
    a gearbox that is disposed at a second side of the motor housing and that includes a plurality of gears configured to reduce a rotational speed of the electric motor.

13. The module of claim 12, wherein the first fluid is oil and the second fluid is water.

14. The module of claim 12, wherein the plurality of injection nozzles extend in a radial direction of the inner housing, are spaced apart from each other in the circumferential direction of the inner housing, and are configured to spray the first fluid onto a stator coil of the stator.

15. The module of claim 12, wherein the second cooling flow path comprises a plurality of water channels disposed between the plurality of oil channels that are spaced apart from each other in the longitudinal direction of the inner housing and that extend along the circumferential direction of the inner housing.

\* \* \* \* \*